US012715226B2

(12) United States Patent
Taigel et al.

(10) Patent No.: US 12,715,226 B2
(45) Date of Patent: Aug. 25, 2026

(54) METHOD OF SETTING UP A POSITION MEASUREMENT SYSTEM FOR A LABELER OF A PRICE LABELING SYSTEM

(71) Applicant: Bizerba SE & Co. KG, Balingen (DE)

(72) Inventors: Florian Taigel, Ofterdingen (DE); René Fichter, Geislingen (DE)

(73) Assignee: Bizerba SE & Co. KG, Balingen (DE)

( * ) Notice: Subject to any disclaimer, the term of this patent is extended or adjusted under 35 U.S.C. 154(b) by 578 days.

(21) Appl. No.: 18/085,429

(22) Filed: Dec. 20, 2022

(65) Prior Publication Data

US 2023/0202202 A1 Jun. 29, 2023

(30) Foreign Application Priority Data

Dec. 23, 2021 (EP) .................................... 21217478

(51) Int. Cl.
*B41J 3/407* (2006.01)
*G01D 5/14* (2006.01)

(52) U.S. Cl.
CPC ............ *B41J 3/4075* (2013.01); *G01D 5/145* (2013.01)

(58) Field of Classification Search
CPC .......... G01D 5/145; B41J 3/4075; B65C 9/40; B65C 9/42
See application file for complete search history.

(56) References Cited

U.S. PATENT DOCUMENTS 4,548,105 A * 10/1985 Koutonen ............ B26D 7/2635 83/13
4,698,996 A 10/1987 Kreft et al.
6,179,030 B1 * 1/2001 Rietheimer ........... B65C 9/1869 156/542

(Continued)

FOREIGN PATENT DOCUMENTS

DE 34 43 176 C1 11/1990
DE 10 2004 035 284 A1 2/2006

(Continued)

OTHER PUBLICATIONS

Andreas Voss et al., “Scalable linear magneto resistive sensor arrays”, TE Sensor Solutions, 18.GMA/ITG Symposium Sensors and Measurement systems pp. 195-199 (2016).

(Continued)

*Primary Examiner* — George R Koch
(74) *Attorney, Agent, or Firm* — Dentons Durham Jones Pinegar

(57) ABSTRACT

Disclosed is a method of automatically setting the position of a labeler of a price labeling system having a sensor strip having a plurality of sensors, arranged in a row and each having unique identifier, a magnet is adjusted along the sensor strip, wherein, the magnet is guided past the sensors of the sensor strip in accordance with the order of their arrangement, on the guiding past the respective sensor, the respective unique identifier of said respective sensor is transmitted to a control and evaluation unit, the order of the arrangement of the sensors on the sensor strip is recognized (Continued)

Figure 1:
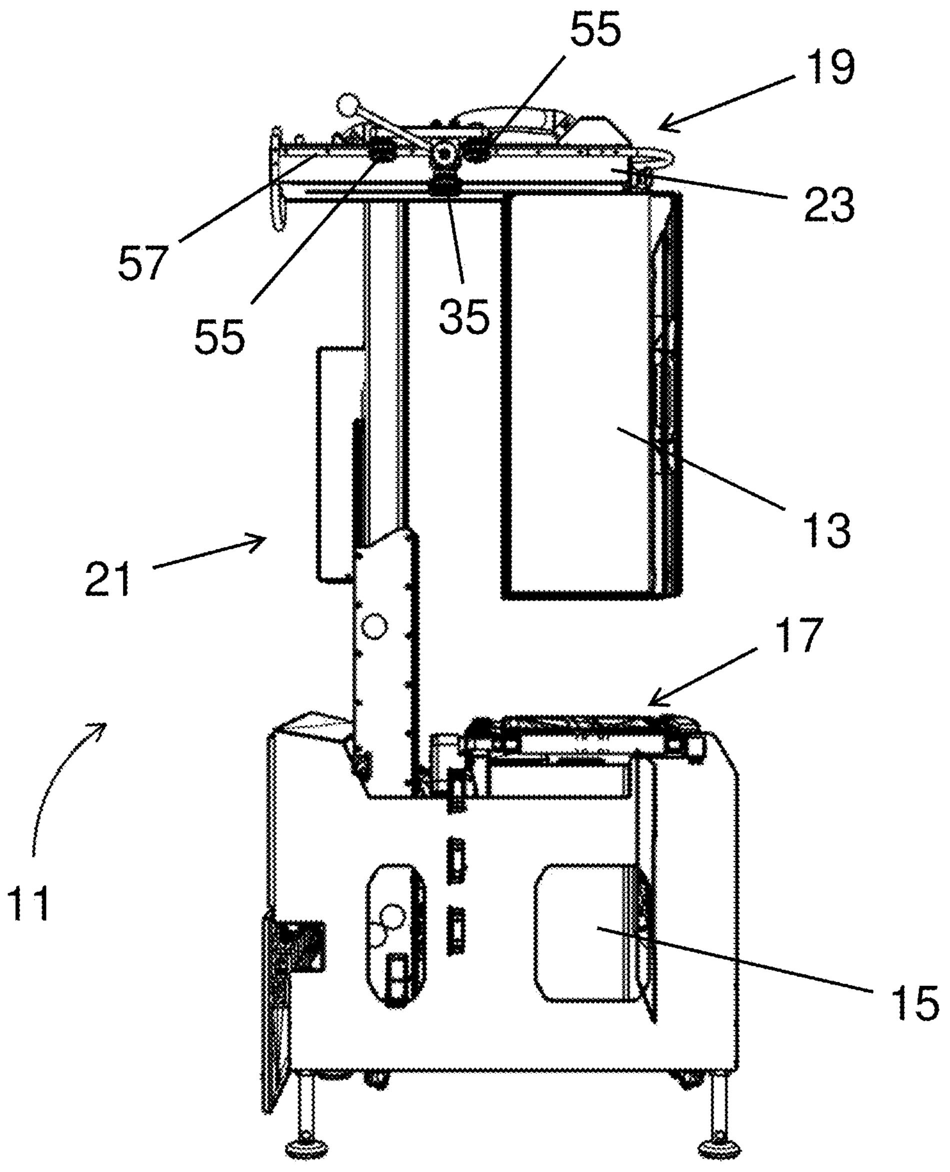

based on the order of the reception of the unique identifiers, and the position of the respective sensor on the sensor strip is calculated from the known mutual distance of the sensors from one another and from the recognized order of the arrangement of the sensors on the sensor strip.

20 Claims, 4 Drawing Sheets

(56) References Cited

U.S. PATENT DOCUMENTS

2009/0243402 A1* 10/2009 O'Day ................. G01D 5/2449
318/135
2010/0039103 A1* 2/2010 Lenz ...................... G01D 5/145
324/207.24
2018/0141696 A1* 5/2018 Pfau .......................... B65C 9/40

FOREIGN PATENT DOCUMENTS

DE 10 2013 203 456 A1 8/2014
DE 10 2013 014 282 A1 3/2015

OTHER PUBLICATIONS

European Search Report dated Jun. 1, 2022 in related European patent application No. 21217478.3 (six pages).

* cited by examiner

METHOD OF SETTING UP A POSITION MEASUREMENT SYSTEM FOR A LABELER OF A PRICE LABELING SYSTEM

This application claims priority to European Patent Application No. 21217478.3, filed Dec. 23, 2021, the disclosure of which is incorporated by reference herein.

The invention relates to a method of setting up a position measurement system that is used when setting the position of a labeler of a price labeling system.

Price labeling systems can be integrated into production lines in the food industry to automatically label packages previously weighed by a weighing belt, i.e. packaged goods. In this respect, the packages run past the labeler on a conveyor belt and are provided with a label in the process. The label positions at the packages to be labeled can be set via the position of the labeler. In known price labeling systems, the position of the labeler in the vertical and/or horizontal direction is determined via mechanical sliding potentiometers. However, they can be subject to wear so that their service life is limited.

It is generally also conceivable to determine the position of the labeler by means of a sensor strip having a plurality of magnetic field-sensitive sensors arranged in a row and based on the position of a magnet, which is adjustable along the sensor strip, relative to the sensor strip. Here, the sensors output a sensor signal together with their respective address to a control and evaluation unit when the magnet is in the vicinity of the respective sensor. In this respect, the position of each sensor on the sensor strip has to be known, i.e. it has to be known in which order the sensors are arranged on the sensor strip. This order can be stored in the electronics of the sensor strip by the sensor strip manufacturer during the production of the sensor strip. Such a magnetic position measurement system has a long service life.

However, if the sensor strip is assembled from a plurality of sensor strip components that each have a plurality of magnetic field-sensitive sensors in order to obtain a sensor strip length suitable for the respective application, the order of the arrangement of the sensor strip components also has to be stored in the electronics. However, this is no longer possible if the sensor strip components are only randomly taken from a stock of sensor strip components at the manufacturer of the price labeling system and are assembled to form the sensor strip.

The invention is based on the object of providing the conditions so that the position of a labeler of a price labeling system can be set using a position measurement system that is durable and easy to set up by the manufacturer of the price labeling system.

This object is satisfied by a method having the features of claim 1, and in particular by a method of automatically setting up a magnetic position measurement system that is used when setting the position of a labeler of a price labeling system and that has a sensor strip having a plurality of magnetic field-sensitive sensors, which are arranged in a row and which each have a unique identifier, in particular Hall sensors, a magnet that can be adjusted along the sensor strip, and a control and evaluation unit that is connected to the sensors, wherein, in the method, from the point of view of the sensor strip, the magnet is guided past the sensors of the sensor strip in accordance with the order of their arrangement, on the guiding past the respective sensor, the respective unique identifier of said respective sensor is transmitted to the control and evaluation unit, the order of the arrangement of the sensors on the sensor strip is recognized based on the order of the reception of the unique identifiers, and the position of the respective sensor on the sensor strip is calculated from the known mutual distance of the sensors from one another and from the recognized order of the arrangement of the sensors on the sensor strip and is stored for a normal operation of the magnetic position measurement system.

The invention makes it possible that a magnetic position measurement system can be used with a plurality of magnetic field-sensitive sensors arranged in a row. The order of the arrangement of the sensors on the sensor strip does not already have to be programmed during the production of the sensor strip, but the determination of this order can only be performed by the manufacturer of the price labeling system. For this purpose, the magnet is guided past the sensor strip or, conversely, the sensor strip is guided past the magnet, with, on the guiding past, all the sensors detecting the magnetic field of the magnet after one another and transmitting their respective identifier to a control and evaluation unit in response thereto. From the order of the reception of the identifiers, the order of the arrangement of the sensors on the sensor strip can then be inferred. From this, the positions of the sensors on the sensor strip can be determined together with the known mutual distance of the sensors from one another. The positions of the sensors on the sensor strip can therefore be determined during a teach-in run and stored for a normal operation of the position measurement system. The method is in particular performed and/or controlled by the control and evaluation unit. The feature of a magnet that can be adjusted along the sensor strip is to be understood—as already explained above—such that the magnet can be guided past the sensor strip or, conversely, the sensor strip can be guided past the magnet.

Advantageous embodiments of the invention are set forth in the dependent claims, in the description, and in the drawing.

Provision can in particular be made that the sensor strip comprises a plurality of sensor strip components that each have a plurality of the sensors, wherein the sensor strip components are assembled, in particular plugged together, to form the sensor strip before the guiding of the magnet past the sensors of the sensor strip. A plurality of sensor strip components can therefore be assembled to obtain a sensor strip having the desired length. Sensor strips can be arbitrarily assembled by the manufacturer of the price labeling system using the method in accordance with the invention.

In general, the method could also be performed in the production of the sensor strip. This would be possible with a sensor strip that comprises only one sensor strip component, but it would not be possible with a sensor strip that comprises a plurality of sensor strip components that are assembled in an uncoordinated and random manner. The method is therefore preferably performed on the production and/or on the putting into operation and/or on each start of the magnetic position measurement system and/or of the price labeling system.

The invention further relates to a control and evaluation unit that is configured to perform the method, as described above, wherein the control and evaluation unit claimed is the control and evaluation unit connected to the sensors.

The control and evaluation unit is in particular configured, in a normal operation of the magnetic position measurement system, to determine the position of the magnet relative to the sensor strip based on sensor signals that are transmitted by the sensors when the magnet is located in their vicinity.

In this respect, provision can be made that the control and evaluation unit is configured to determine the position of the magnet based on a plurality of sensor signals and/or that the sensor signals indicate how far away the magnet is from the respective sensor. The accuracy of the determination of the position of the magnet can hereby be increased.

The invention further relates to a magnetic position measurement system that can be used when setting the position of a labeler of a price labeling system and that has a sensor strip having a plurality of magnetic field-sensitive sensors, which are arranged in a row and which each have a unique identifier, in particular Hall sensors, a magnet that can be adjusted along the sensor strip, and a control and evaluation unit that is connected to the magnetic field-sensitive sensors and that is configured to perform a method of automatically setting up the magnetic position measurement system in which, from the point of view of the sensor strip, the magnet is guided past the sensors of the sensor strip in accordance with the order of their arrangement, on the guiding past the respective sensor, the respective unique identifier of said respective sensor is transmitted to the control and evaluation unit, the order of the arrangement of the sensors on the sensor strip is recognized based on the order of the reception of the unique identifiers, and the position of the respective sensor on the sensor strip is calculated from the known mutual distance of the sensors from one another and from the recognized order of the arrangement of the sensors on the sensor strip and is stored for a normal operation of the position measurement system.

Provision can in particular be made that the sensor strip comprises a plurality of sensor strip components that each have a plurality of the sensors and that are assembled, in particular plugged together, to form the sensor strip, as has already been explained above in connection with the method in accordance with the invention.

The invention further relates to a price labeling system comprising at least one labeler, in particular a top labeler for the upper package side and/or a bottom labeler for the lower package side, that is horizontally and/or vertically adjustable via an adjustment system in order to set the position of the labeler, in particular of a drawer of a bottom labeler for the lower package side, and at least one magnetic position measurement system that can be used when setting the position of a labeler of a price labeling system and that has a sensor strip having a plurality of magnetic field-sensitive sensors, which are arranged in a row and which each have a unique identifier, in particular Hall sensors, a magnet that can be adjusted along the sensor strip, and a control and evaluation unit that is connected to the magnetic field-sensitive sensors and that is configured to perform a method of automatically setting up the magnetic position measurement system in which, from the point of view of the sensor strip, the magnet is guided past the sensors of the sensor strip in accordance with the order of their arrangement, on the guiding past the respective sensor, the respective unique identifier of said respective sensor is transmitted to the control and evaluation unit, the order of the arrangement of the sensors on the sensor strip is recognized based on the order of the reception of the unique identifiers, and the position of the respective sensor on the sensor strip is calculated from the known mutual distance of the sensors from one another and from the recognized order of the arrangement of the sensors on the sensor strip and is stored for a normal operation of the position measurement system.

The invention further relates to a price labeling system comprising at least one labeler, in particular a top labeler for the upper package side and/or a bottom labeler for the bottom package side, that is horizontally and/or vertically adjustable via an adjustment system in order to set the position of the labeler, in particular of a drawer of a bottom labeler for the lower package side, and at least one magnetic position measurement system that can be used when setting the position of a labeler of a price labeling system and that has a sensor strip having a plurality of magnetic field-sensitive sensors, which are arranged in a row and which each have a unique identifier, in particular Hall sensors, a magnet that can be adjusted along the sensor strip, and a control and evaluation unit that is connected to the magnetic-field sensors and that is configured, in a normal operation of the magnetic position measurement system, to determine the position of the magnet relative to the sensor strip based on sensor signals that are transmitted by the sensors when the magnet is located in their vicinity.

In this respect, in both of the aforementioned price labeling systems, provision can be made that the sensor strip comprises a plurality of sensor strip components that each have a plurality of the sensors and that are assembled, in particular plugged together, to form the sensor strip. Irrespective thereof, the following embodiments of the invention also apply to both of the aforementioned price labeling systems.

The adjustment system preferably has a spindle motor, a threaded spindle drivable by the spindle motor, and a spindle nut placed onto the threaded spindle, with the magnet being fastened to the spindle nut in order to be adjustable along the sensor strip, and with the labeler being horizontally and/or vertically adjustable when the spindle motor is driven. Via a spindle drive, the position of the magnet and thus the position of the labeler of the price labeling system can be determined or set easily, reliably, and with a high accuracy.

In accordance with a preferred embodiment of the invention, the spindle nut is held in a stationary manner, in particular between the two limbs of a U-shaped holder fixed in a stationary manner, and/or the sensor strip can be moved with the threaded spindle. Since the spindle nut is held in a stationary manner, in the method in accordance with the invention and in the normal operation of the position measurement system, the sensor strip is guided past the magnet, and not vice versa. To adjust the labeler, the threaded spindle moves along its longitudinal direction. In a spindle gear, the threaded spindle is usually held in a stationary manner. If the threaded spindle rotates, the spindle nut moves along the threaded spindle. If, in contrast, the spindle nut is held in a stationary manner, in particular at a carrier device and via the carrier device at a frame of the price labeling system, the threaded spindle itself is subject to a travel movement.

Provision is preferably made that the spindle nut is manufactured in a plastic injection molding process, with preferably a metallic internal thread, in particular an internally threaded sleeve, of the spindle nut and/or the magnet being cast into the injection molding of the spindle nut. The spindle nut can hereby be inexpensively manufactured and a simple fastening of the magnet to the spindle nut can be achieved.

In accordance with a further preferred embodiment of the invention, the price labeling system comprises a holding profile that extends in parallel with the threaded spindle and that has a profile wall having a first side facing the threaded spindle and a second side facing away from the threaded spindle, with the first side being formed in a counter-shape to the spindle nut in order to prevent a rotation of the spindle nut about its axis when the spindle motor is driven, and with a rail, in particular a C-shaped rail, into which the sensor strip is inserted, in particular pushed in, being formed at the second side. The holding profile can thereby fulfill a plurality of functions at the same time since, on the one hand, it can hold the sensor strip and, on the other hand, it can simultaneously serve as a security against rotation for the threaded spindle and can guide the threaded spindle, in particular from the point of view of the holding profile.

In this respect, it is preferred if the holding profile is formed from a plastic or a non-magnetizable material, e.g. aluminum, so that the profile wall disposed between the magnet and the sensors disturbs the magnetic field of the magnet as little as possible and the position of the magnet can thus be determined particularly precisely.

Figure 2A:
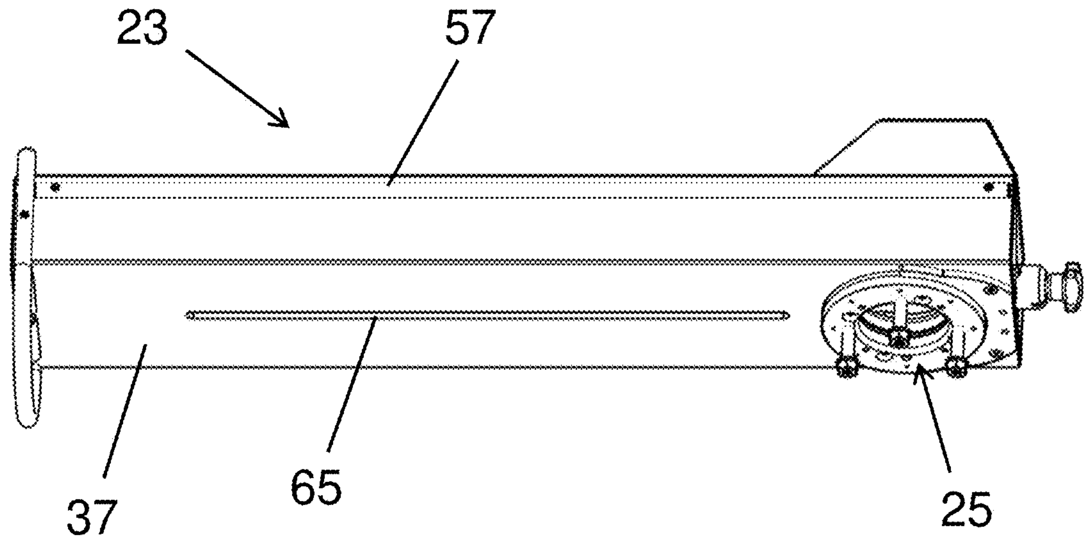
Figure 2B:
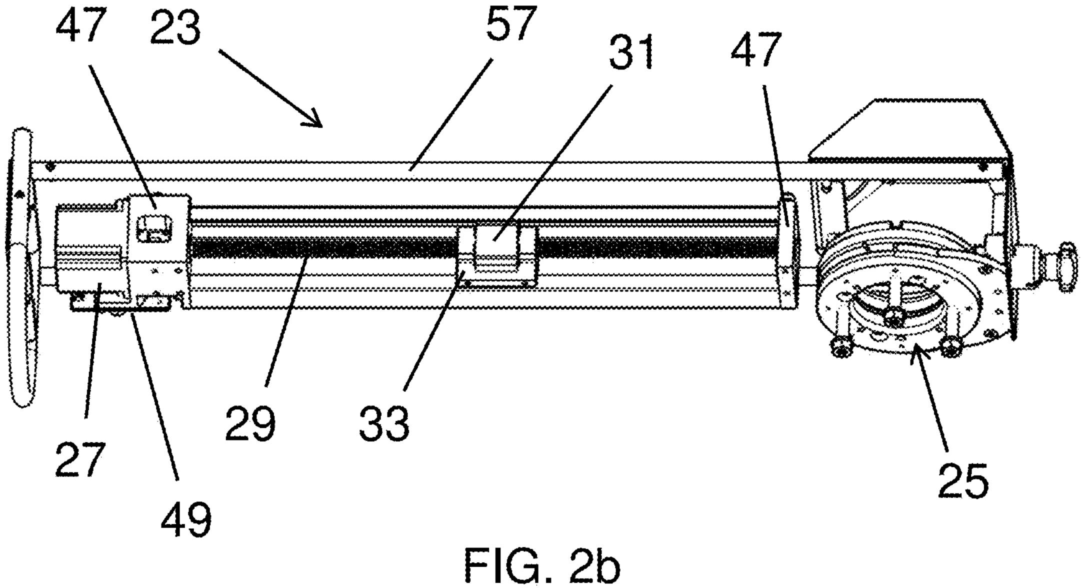
Figure 2C:
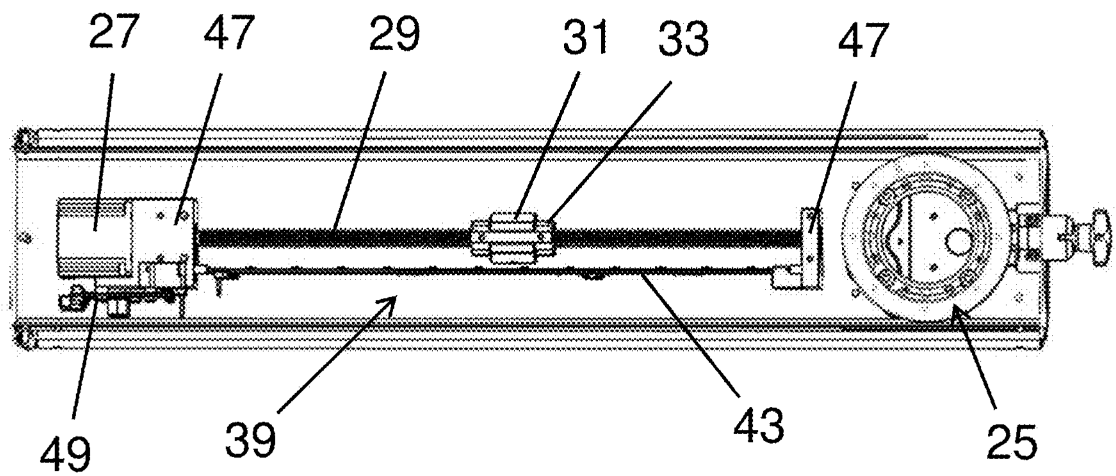
Figure 2D:
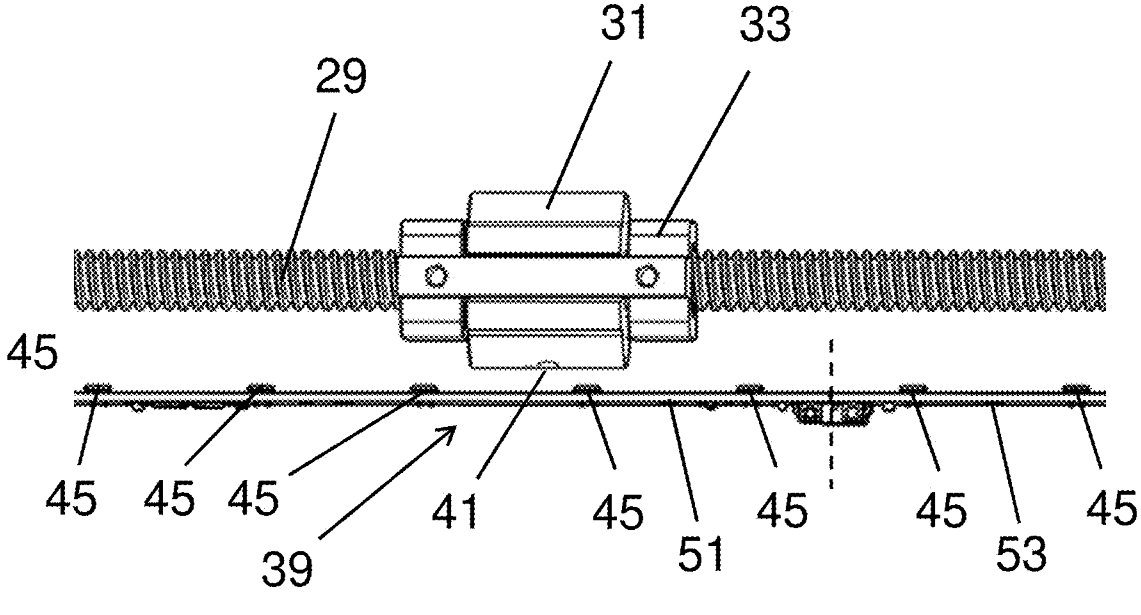

The invention will be described in the following by way of example with reference to the drawing. There are shown:

FIG. 1 a price labeling system in accordance with the invention in a side view with a labeler and an adjustment system for horizontally adjusting the position of the labeler;

FIG. 2*a* the adjustment system in an individual view;

FIG. 2*b* the adjustment system in accordance with FIG. 2*a* without a housing;

FIG. 2*c* the adjustment system with a magnetic position measurement system;

FIG. 2*d* an enlarged representation of the magnetic position measurement system in accordance with FIG. 2*c;*

Figure 3:
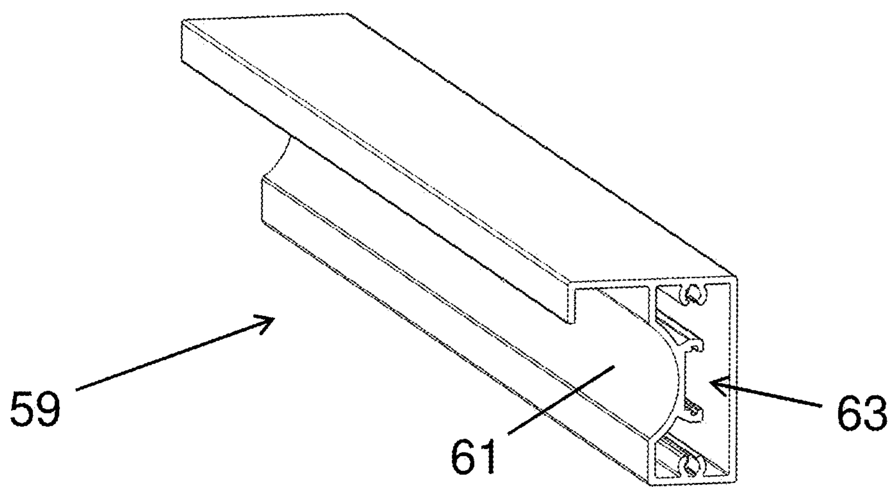

FIG. 3 a holding profile for the magnetic position measurement system; and

Figure 4:
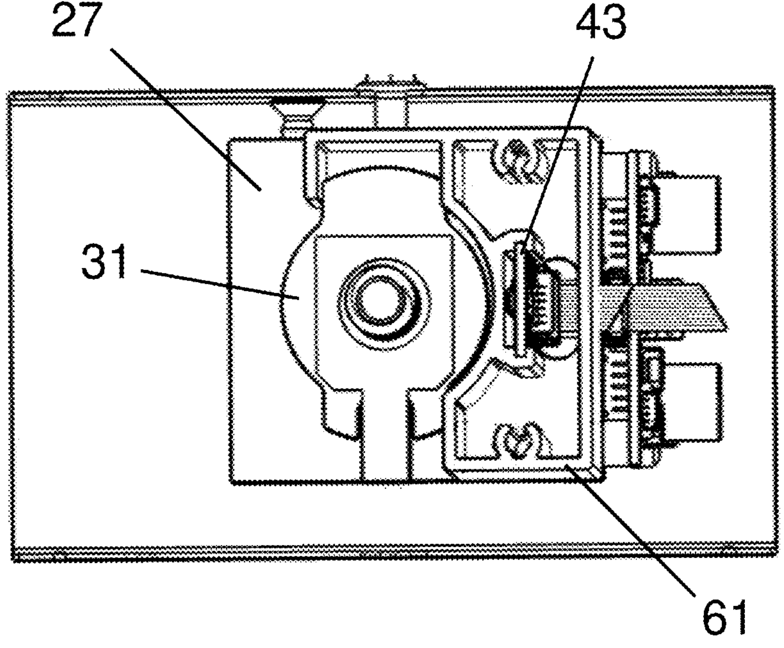

FIG. 4 a cross-section through the adjustment system with the magnetic position measurement system.

In the food industry, packages are transported via conveyor belts and are automatically weighed and labeled in the process. FIG. 1 shows a price labeling system 11 that is preceded by a weighing belt, not shown, on which the packages are weighed and subsequently fed to the price labeling system 11 in order to apply labels to the packages. For this purpose, the price labeling system shown in FIG. 1 comprises two labelers 13, 15, namely a top labeler 13 and a bottom labeler 15. The top labeler 13 is located above a conveyor belt 17, which is formed by two directly consecutive partial conveyor belts and on which the packages enter, and applies labels from above to the upper side of the packages. The bottom labeler 15 is located beneath the conveyor belt 17 and dispenses labels from below through a gap, which is formed between the two partial conveyor belts, onto the lower side of the packaged goods. The two labelers 13, 15 can be operated selectively, in particular in dependence on the packaged goods, or simultaneously, wherein one of the two labels can then be a decorative label. The division of the conveyor belt 17 into the two directly consecutive partial conveyor belts cannot be seen from FIG. 1.

The top labeler 13 can be horizontally adjusted via an adjustment system 19 and can be vertically adjusted via a further adjustment system 21. The position of the top labeler 13 relative to the packages, and thus the label position at the packages to be labeled, can be set via the adjustment system 19. The bottom labeler 15 is arranged on a pullout, which cannot be seen, and can be pulled to the right out of the price labeling system 11 in FIG. 1 in order to improve accessibility to the bottom labeler 15. The bottom labeler 15 can likewise be adjustable in its position via at least one adjustment system. The adjustment system 19 is described below. The further adjustment system 21 has an analog design and is therefore not explained separately.

The adjustment system 19 is accommodated in an elongated carriage 23 which is movably supported via two running rails 57, of which only one can be seen, in support rollers 55 and to whose one end the labeler 13 is attached at a fastening point 25, as can be seen from the perspective view obliquely from below in accordance with FIG. 2*a*. In FIG. 2*b*, a housing 37 of the carriage 23 is omitted so that a spindle motor 27, a threaded spindle 29 drivable by the spindle motor 27, and a spindle nut 31 placed onto the threaded spindle 29 and configured as a plastic molded part can be seen. In this respect, the spindle nut 31 is held in a stationary manner, and indeed between the two limbs of a U-shaped holder 33 that is fixed to a carrier device 35 of the price labeling system 11. For this purpose, the carrier device 35 engages through a slit 65 formed in the housing 37. Since the spindle nut 31 is held in a stationary manner, the threaded spindle 29 and, with it, the carriage 23 are moved, and thus the labeler 13 is horizontally adjusted, when the spindle motor 27 is driven.

A magnetic position measurement system 39 that is used to set the position of the labeler 13 and that is shown in a view from below in accordance with FIGS. 2*c* and 2*d* is integrated into the adjustment system 19. The position measurement system 39 comprises a magnet 41, which is fastened to the spindle nut 31, in particular cast into the spindle nut 31, and a sensor strip 43 having a plurality of magnetic field-sensitive sensors 45 arranged in a row, in particular Hall sensors. In the present embodiment, twelve sensors 45 are provided. The sensor strip 43 is fixedly connected to the carriage 23 via a holding profile 59, explained in more detail below, and two bearings 47. The sensor strip 43 is therefore movable with the threaded spindle 29 and the carriage 23. By moving the sensor strip 43, the magnet 41 is adjustable along the sensor strip 43.

Furthermore, the magnetic position measurement system 39 comprises a control and evaluation unit 49 that is connected to the sensors 45 and that receives sensor signals from the sensors 45 that each have a unique identifier of the respective sensor 45 and that indicate when the magnet 41 is located in the region of the respective sensor 45. In a normal operation of the magnetic position measurement system, the position of the magnet 41 relative to the sensor strip 43 can thereby be determined. The control and evaluation unit 49 is in particular capable of determining the position of the magnet 41 based on a plurality of sensor signals. In this respect, the sensor signals in each case not only indicate the presence of the magnet 41, but also how far away the magnet 41 is from the respective sensor 45. An accurate position determination is hereby achieved.

The sensor strip 43 is assembled, in particular plugged together, from two sensor strip components 51, 53 in the present case and, for example, from a first sensor strip component 51 having eight sensors 45 and a second sensor strip component 53 having four sensors 45. The division of the sensor strip 43 into the two sensor strip components 51, 53 is indicated by a dashed line in FIG. 2*d*. The two sensor strip components 51, 53 were not already assembled by the manufacturer of the sensor strip 43, but only by the manufacturer of the price labeling system 11. The sensor strip components 51, 53 were taken from a set of sensor strip components having different lengths, wherein each length can, however, be present a multiple of times. In general, the set can also only comprise a plurality of sensor strip components of the same length. A sensor strip 43 having the most suitable length for the respective price labeling system 11 or the respective labeler 13 can hereby be selected on site.

So that the assembled sensor strip 43 can be used, the control and evaluation unit 49 has to be familiar with the order of the arrangement of the sensors 45, in particular the order of the arrangement of the sensor strip components 51, 53. To make this possible, a method of automatically setting up the magnetic position measurement system 39 is performed on the putting into operation of the magnetic position measurement system 39 or of the price labeling system 11. In this method, the spindle motor 27 is switched on and thus—from the point of view of the sensor strip 43—the magnet 41 is guided past the sensors 45 of the sensor strip 43 in accordance with the order of the arrangement of the sensors 45. On the guiding past the respective sensor 45, the respective unique identifier of the respective sensor 45 is then transmitted to the control and evaluation unit 49.

Based on the order of the reception of the unique identifiers, the order of the arrangement of the sensors 45 on the sensor strip 45 can then also be determined by the control and evaluation unit 49. From this and from the known distance of the sensors 45 from one another, the positions of the sensors 45 on the sensor strip 43 can be calculated and stored for the normal operation of the position measurement system 39.

The sensor strip 43 is inserted into the holder profile 59 already mentioned above, as shown in the perspective view in accordance with FIG. 4. The holding profile 59, which is shown in an individual representation in FIG. 3, has a profile wall 61 having a side facing the threaded spindle 29 and a side facing away from the threaded spindle 29. The side facing the threaded spindle 29 is formed in a counter-shape to the spindle nut 31. The threaded spindle 29 can—relatively seen—slide along this side, wherein this side simultaneously represents a security against rotation for the threaded spindle 29. A C-shaped rail 63, into which the sensor strip 43 is pushed, is formed at the side facing away from the threaded spindle 29. The holding profile 59 consists of a plastic or a non-magnetizable material, e.g. aluminum, to shield the magnetic field of the magnet 41 as little as possible.

REFERENCE NUMERAL LIST

11 price labeling system
13 top labeler
15 bottom labeler
17 conveyor belt
19 adjustment system
21 further adjustment system
23 carriage
25 fastening point
27 spindle motor
29 threaded spindle
31 spindle nut
33 holder
35 carrier device
37 housing
39 position measurement system
41 magnet
43 sensor strip
45 sensor
47 bearing
49 control and evaluation unit
51 sensor strip component
53 sensor strip component
55 support roller
57 running rail
59 holding profile
61 profile wall
63 rail
65 slit

The invention claimed is:

1. A method of automatically setting up a magnetic position measurement system that is used when setting a position of a labeler of a price labeling system and that has a sensor strip having a plurality of magnetic field-sensitive sensors, which are arranged in a row and which each have a unique identifier, a magnet that can be adjusted along the sensor strip, and a control unit that is connected to the sensors, the method comprising,
during a teach-in run, from the point of view of the sensor strip, guiding the magnet past all the sensors of the sensor strip in accordance with an order of their arrangement,
on the guiding past a respective one of the sensors, transmitting the unique identifiers of all the sensors to the control unit,
recognizing the order of the arrangement of all the sensors on the sensor strip based on an order of reception of the unique identifiers, and
calculating a position of each sensor on the sensor strip from a known mutual distance of the sensors from one another and from the recognized order of the arrangement of all the sensors on the sensor strip and storing the position of each sensor on the sensor strip for a normal operation of the magnetic position measurement system.

2. The method in accordance with claim 1,
wherein the sensor strip comprises a plurality of sensor strip components that each have a plurality of the sensors, with the sensor strip components being assembled to form the sensor strip before the guiding of the magnet past the sensors of the sensor strip.

3. The method in accordance with claim 1,
wherein the method is performed on the production and/or on the putting into operation and/or on each start of the magnetic position measurement system and/or of the price labeling system.

4. The method in accordance with claim 1,
wherein the method is performed by the control unit.

5. A control unit that is configured to perform a method of automatically setting up a magnetic position measurement system that is used when setting a position of a labeler of a price labeling system and that has a sensor strip having a plurality of magnetic field-sensitive sensors, which are arranged in a row and which each have a unique identifier, a magnet that can be adjusted along the sensor strip, and the control unit that is connected to the sensors, the method comprising,
during a teach-in run, from the point of view of the sensor strip, guiding the magnet past all the sensors of the sensor strip in accordance with an order of their arrangement,
on the guiding past a respective one of the sensors, transmitting the unique identifiers of all the sensors to the control unit,
recognizing the order of the arrangement of all the sensors on the sensor strip based on an order of reception of the unique identifiers, and
calculating a position of each sensor on the sensor strip is calculated from a known mutual distance of the sensors from one another and from the recognized order of the arrangement of all the sensors on the sensor strip and storing the position of each sensor on the sensor strip for a normal operation of the magnetic position measurement system.

6. The control unit in accordance with claim 5,
wherein the control unit is configured, in a normal operation of the magnetic position measurement system, to determine a position of the magnet relative to the sensor strip based on sensor signals that are transmitted by the sensors when the magnet is located in their vicinity.

7. The control unit in accordance with claim 5, wherein the control unit is configured to determine a position of the magnet based on a plurality of sensor signals, and/or wherein the sensor signals indicate how far away the magnet is from the respective sensor.

8. A magnetic position measurement system that can be used when setting a position of a labeler of a price labeling system and that has a sensor strip having a plurality of magnetic field-sensitive sensors, which are arranged in a row and which each have a unique identifier, a magnet that can be adjusted along the sensor strip, and a control unit that is connected to the magnetic field-sensitive sensors and that is configured to perform a method of automatically setting up the magnetic position measurement system, the method comprising, during a teach-in run, from the point of view of the sensor strip, guiding the magnet past all the sensors of the sensor strip in accordance with an order of their arrangement, on the guiding past a respective one of the sensors, transmitting the unique identifiers of all the sensors to the control unit, recognizing the order of the arrangement of all the sensors on the sensor strip based on an order of reception of the unique identifiers, and calculating a position of each sensor on the sensor strip from a known mutual distance of the sensors from one another and from the recognized order of the arrangement of all the sensors on the sensor strip and storing the position of each sensor on the sensor strip for a normal operation of the magnetic position measurement system.

9. The magnetic position measurement system in accordance with claim 8, wherein the sensor strip comprises a plurality of sensor strip components that each have a plurality of the sensors and that are assembled to form the sensor strip.

10. A price labeling system comprising at least one labeler that is horizontally and/or vertically adjustable via an adjustment system in order to set a position of the labeler, and at least one magnetic position measurement system that can be used when setting the position of the labeler of the price labeling system and that has a sensor strip having a plurality of magnetic field-sensitive sensors, which are arranged in a row and which each have a unique identifier, a magnet that can be adjusted along the sensor strip, and a control unit that is connected to the magnetic field-sensitive sensors and that is configured to perform a method of automatically setting up the magnetic position measurement system, the method comprising, during a teach-in run, from the point of view of the sensor strip, guiding the magnet past all the sensors of the sensor strip in accordance with an order of their arrangement, on the guiding past a respective one of the sensors, transmitting the unique identifiers of all the sensors to the control unit, recognizing the order of the arrangement of all the sensors on the sensor strip based on an order of reception of the unique identifiers, and calculating a position of each sensor on the sensor strip from a known mutual distance of the sensors from one another and from the recognized order of the arrangement of all the sensors on the sensor strip and storing the position of each sensor on the sensor strip for a normal operation of the magnetic position measurement system.

11. The price labeling system in accordance with claim 10, wherein the labeler is a top labeler and/or a bottom labeler.

12. The price labeling system in accordance with claim 10, wherein the adjustment system has a spindle motor, a threaded spindle drivable by the spindle motor, and a spindle nut placed onto the threaded spindle, with the magnet being fastened to the spindle nut to be adjustable along the sensor strip, and with the labeler being horizontally and/or vertically adjustable when the spindle motor is driven.

13. The price labeling system in accordance with claim 12, wherein the spindle nut is held in a stationary manner and/or the sensor strip can be moved with the threaded spindle.

14. The price labeling system in accordance with claim 13, wherein the spindle nut is held between two limbs of a U-shaped holder fixed in a stationary manner.

15. The price labeling system in accordance with claim 12, wherein the spindle nut is manufactured in a plastic injection molding process.

16. The price labeling system in accordance with claim 15, wherein a metallic internal thread of the spindle nut and/or the magnet is cast into the injection molding of the spindle nut.

17. The price labeling system in accordance with claim 16, wherein the metallic internal thread is an internally threaded sleeve.

18. The price labeling system in accordance with claim 12, wherein the price labeling system comprises a holding profile that extends in parallel with the threaded spindle and that has a profile wall having a first side facing the threaded spindle and a second side facing away from the threaded spindle, with the first side being formed in a counter-shape to the spindle nut in order to prevent a rotation of the spindle nut about its axis when the spindle motor is driven, and with a rail, into which the sensor strip is inserted, being formed at the second side.

19. The price labeling system in accordance with claim 18, wherein the rail is a C-shaped rail.

20. The price labeling system in accordance with claim 18, wherein the holding profile is formed from a plastic or a non-magnetizable material.

* * * * *